Patented Mar. 6, 1951

2,543,783

UNITED STATES PATENT OFFICE 2,543,783

METHOD OF PURIFYING RUTIN

Charles F. Krewson, Philadelphia, Pa., assignor to the United States of America as represented by the Secretary of Agriculture No Drawing. Application May 20, 1949, Serial No. 94,531

2 Claims. (Cl. 260—210)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to a method of separating rutin from a hot aqueous solution of it and impurities.

Rutin occurs in a wide variety of plants and its recovery by usual methods involves extraction of rutin-bearing plant tissues, usually at an elevated temperature, with water, or organic solvents such as various alcohols and ketones, and further processing of the extract.

The conventional method of obtaining rutin from buckwheat, for example, comprises extracting the plant material with an organic solvent, followed by evaporation of the extract, usually with addition of water, to remove the solvent. The aqueous concentrate thus obtained, having a volume of about ⅛ to 1/12 of that of the initial plant extract and containing the rutin in the form of a supersaturated solution, is filtered while hot through a glass fiber filter as described in U. S. Patent No. 2,453,305, to remove fat impurities. The hot filtrate, a hot aqueous concentrate of crude rutin containing sufficient water to maintain the crude rutin in solution at boiling temperature, is allowed to stand at room temperature until the rutin crystallizes out, which usually requires about 20 hours, and the crystals are removed.

The crude rutin so obtained contains extraneous substances of undetermined nature, comprising benzene-soluble fatty material and certain skin-photosensitizing impurities known as "red pigment," and requires further purification.

In general, according to the present invention, the hot aqueous concentrate of crude rutin obtained following the filtration mentioned above is quickly cooled to a temperature above the freezing point but not in excess of 10° C., and the temperature maintained to obtain substantially complete crystallization of the rutin, which usually requires not more than about one hour, the crystallized rutin being immediately thereafter removed from the mother liquor.

The quick cooling of the crude rutin concentrate to a low temperature gives rise not to small crystals as in the usual rapid crystallization procedures, but to a solid material consisting of flocks of crystals larger than those obtained by crystallization at room temperature. According to the generally accepted theory relating to purification by crystallization procedure, it is considered desirable to produce fine crystals since these have a tendency to occlude smaller amounts of impurities than larger crystals. In the case of rutin, the reverse appears to be true. Also, it appears that in the crystallization of crude rutin, contamination with extraneous products dissolved or dispersed in the solution is promoted by prolonged contact of the solid rutin particles with the mother liquor. Therefore, according to the present invention, it is desirable that the crystallized rutin be removed from the mother liquor as soon after completion of crystallization as convenient.

The method of the invention results in the recovery of higher quality rutin with yields equal to those produced by conventional crystallization procedures. Another advantage is that the so produced crystallized rutin is more readily separated from the mother liquor by filtration and freed of adhering impurity-containing mother liquor by washing of the filter cake. Thus, usually the crystallized rutin so obtained can be filtered off and washed on a filter consisting of a fine cheesecloth stretched over the top of a suitable vessel, such as a tank or kettle.

Although the present method can be conducted using any cooling means adapted to lower rapidly the temperature of a given volume of liquid, it is preferred to cool the hot aqueous concentrate of crude rutin by admixing it with an amount of ice sufficient to bring the temperature of the mixture within the specified range, preferably within a few degrees of 5° C., and to so maintain it for the length of time necessary to cause essentially complete separation of solid rutin from the solution, which under ordinary operational conditions is attained within approximately one hour.

The following examples illustrate the invention.

*Example I*

500 g. of buckwheat leaf meal (by analysis, crude rutin, 3.59%; moisture, 7.35%) was boiled for 10 minutes with 3.5 liters of 75% (by volume) isopropyl alcohol. The extract was removed from the marc by filtration and the marc mixed with 3.5 liters of 75% isopropyl alcohol and again boiled for 10 minutes. Filtration was repeated and the marc washed 3 times with 1-liter portions of hot 75% isopropyl alcohol. The combined extracts and washings were evaporated at atmospheric pressure to 1 liter. One liter of boiling water was added to the 1 liter of boiling concentrate and the mixture boiled for 10 minutes to remove traces of isopropyl alcohol, and was then filtered at near boiling temperature first through a glass wool filter and then through a heavy asbestos-cellulose filter pad to remove fat impurities.

The filtrate, a hot aqueous concentrate of crude rutin, was divided into two equal portions, A and B, portion A being treated according to the method of the present invention and portion B according to the usual method for purposes of comparison.

Portion A was cooled to about 15° C. with running water and then to about 5° C. by addition of approximately 236 g. of crushed ice, and was then allowed to stand at about 5° C. for one hour, after which the rutin that had separated from the solution was filtered off and dried to constant weight at 110° C. Portion B was allowed to cool spontaneously at room temperature, and after standing for 20 hours was filtered to remove the rutin which was then dried to constant weight at 110° C.

The rutin thus obtained from portions A and B weighed 8.34 g. and 8.38 g., respectively. Each was analyzed spectrophotometrically by the method described in U. S. Dept. of Agriculture, Bur. Agr. Ind. Chem. AIC-159 (1947). From the relative position of the spectrophotometric curves the rutin from portion A was found to contain considerably less impurities than that from portion B, and the amount of red pigment found in portion B was approximately 5.2 times that in portion A. Samples of both rutin preparations were analyzed for the presence of fatty impurities by extraction in a Soxhlett apparatus using benzene as the solvent. Rutin obtained from portion A of the filtrate was found to contain 0.13% benzene-soluble impurities, while that derived from portion B contained 0.17% of such impurities, that is, approximately 23.5% more benzene solubles than the rutin obtained by the rapid, low-temperature crystallization procedure.

*Example II*

50 pounds of whole (less roots) green, freshly harvested buckwheat was boiled for 10 minutes, with 20 gallons of 85% (by volume) isopropyl alcohol. This first hot extract was drawn off, filtered by pressure through 2 square feet of heavy filter sheets backed with canvas and pumped into an evaporator. Similarly, a second and third 10-minute extract was made, using 12 gallons of 85% isopropyl alcohol in each case.

Each extract was worked up separately for crude rutin. The first extract of approximately 16 gallons was evaporated at atmospheric pressure to 2.5-3 gallons. The boiling concentrate was strained through glass wool and filtered through about one square foot of heavy filter sheet and the filtrate, the hot aqueous concentrate of crude rutin, was immediately cooled to a temperature of about 5° C. by the addition of 10-15 pounds of crushed ice. After cooling, the mixture containing crude crystallized rutin was allowed to stand at low temperature (5°-10° C.) for one hour, after which it was filtered off on a hard surfaced paper, thoroughly washed with small portions of cold water, and dried at 110° C. to a constant weight of 64.5 g. The second and third extracts of approximately 12 gallons were each evaporated to about ¾ gallon, strained, filtered and with a ¼ gallon washing cooled with about 5 pounds of crushed ice. These solutions were allowed to stand one hour at low temperature (5°-10° C.) for complete crystallization of crude rutin. The dried crude rutin from the second extract weighed 12.0 g. and from the third extract 6.5 g. No further precipitation of crude rutin occurred after the mother liquors stood for 48-hour periods in the cold room at a temperature of about 5° C. The entire experiment, from the cutting of the green buckwheat through the extraction and isolation of the rutin, was completed in one eight-hour working day.

The above-described process was repeated, except that the filtered concentrates and washing obtained in each of the three consecutive extraction steps, were combined and allowed to cool gradually on standing at room temperature for a period of about 20 hours, according to the conventional procedure. Essentially the same yield of crude rutin was thus recovered. However, analyses of rutin samples obtained by both methods of crystallization showed that crude rutin produced by rapid crystallization at low temperature according to the present invention contained less impurities and had a composition substantially similar to that of the crude rutin of portion A described in Example I, while the crude rutin obtained by crystallization according to the conventional procedure was similar in composition to that derived from portion B of Example I.

Using procedures analogous to those described in the foregoing examples, except that solvents other than isopropyl alcohol, such as methyl, ethyl or normal propyl alcohol, or ketones like acetone or methyl ethyl ketone, were employed in the first extraction of the buckwheat, similar results were obtained.

I claim:

1. The method of separating rutin from a hot aqueous concentrate of crude rutin containing sufficient water to maintain the rutin in solution at boiling temperature, said concentrate having been produced by solvent extraction of rutin-bearing plant material and filtration of the extract to remove fat impurities, comprising quickly cooling the hot aqueous concentrate to a temperature above the freezing point but not in excess of 10° C., maintaining the temperature for about 1 hour to obtain substantially complete crystallization of the rutin, and immediately thereafter removing the rutin from the mother liquor.

2. The method of separating rutin from a hot aqueous concentrate of crude rutin containing sufficient water to maintain the rutin in solution at boiling temperature, said concentrate having been produced by solvent extraction of rutin-bearing plant material and filtration of the extract to remove fat impurities, comprising quickly cooling the hot aqueous concentrate to a temperature above the freezing point but not in excess of 10° C. by addition of ice, maintaining the temperature for about 1 hour to obtain substantially complete crystallization of the rutin, and immediately thereafter removing the rutin from the mother liquor.

CHARLES F. KREWSON.

REFERENCES CITED

The following references are of record in the file of this patent:

Eskew et al.: Bur. Agr. Ind. Chem., Dept. Agri. Circular AIC-114, pages 9, 10, 2 pages.